United States Patent [19]
Gilbert et al.

[11] Patent Number: 5,737,365
[45] Date of Patent: Apr. 7, 1998

[54] METHOD AND APPARATUS FOR DETERMINING A RECEIVED SIGNAL QUALITY ESTIMATE OF A TRELLIS CODE MODULATED SIGNAL

[75] Inventors: Stephen S. Gilbert, Lake Zurich; Gregory W. Cox, Schaumburg, both of Ill.

[73] Assignee: Motorola, Inc., Schaumburg, Ill.

[21] Appl. No.: 548,853

[22] Filed: Oct. 26, 1995

[51] Int. Cl.[6] .............................. H04B 3/46; H04B 17/00
[52] U.S. Cl. ............................................ 375/224; 371/43.7
[58] Field of Search ............................. 375/224, 340, 375/341, 262, 265, 261, 220, 219; 371/43, 43.7, 43.1; 341/94; 370/332, 333

[56] References Cited

U.S. PATENT DOCUMENTS

| | | | |
|---|---|---|---|
| 5,157,672 | 10/1992 | Kondou et al. | 371/43 |
| 5,497,383 | 3/1996 | Thome et al. | 371/43 |
| 5,509,031 | 4/1996 | Johnson et al. | 375/262 |

OTHER PUBLICATIONS

Peyton Z. Peebles, Jr., Digital Communications System, pp. 98–102, Sep. 1986.

*Primary Examiner*—Stephen Chin
*Assistant Examiner*—Betsy L. Deppe
*Attorney, Agent, or Firm*—Christopher P. Moreno

[57] ABSTRACT

For each of one or more received trellises, a convolutional decoder (808) determines a path metric (812) and a signal strength estimator (809) determines a signal strength estimate (813). A signal quality estimator (810) processes the path metrics and signal strength estimates for each of the received trellises and produces a received signal quality estimate (814), the received signal quality estimate being indicative of a signal-to-interference-plus-noise ratio, a bit error rate, or a block error rate. This approach is well-suited for use with schemes having high-order symbol constellations. When incorporated into an RF transceiver 700, the received signal quality estimate can be used in the selection of an encoding scheme best adapted to ongoing RF channel conditions.

28 Claims, 7 Drawing Sheets

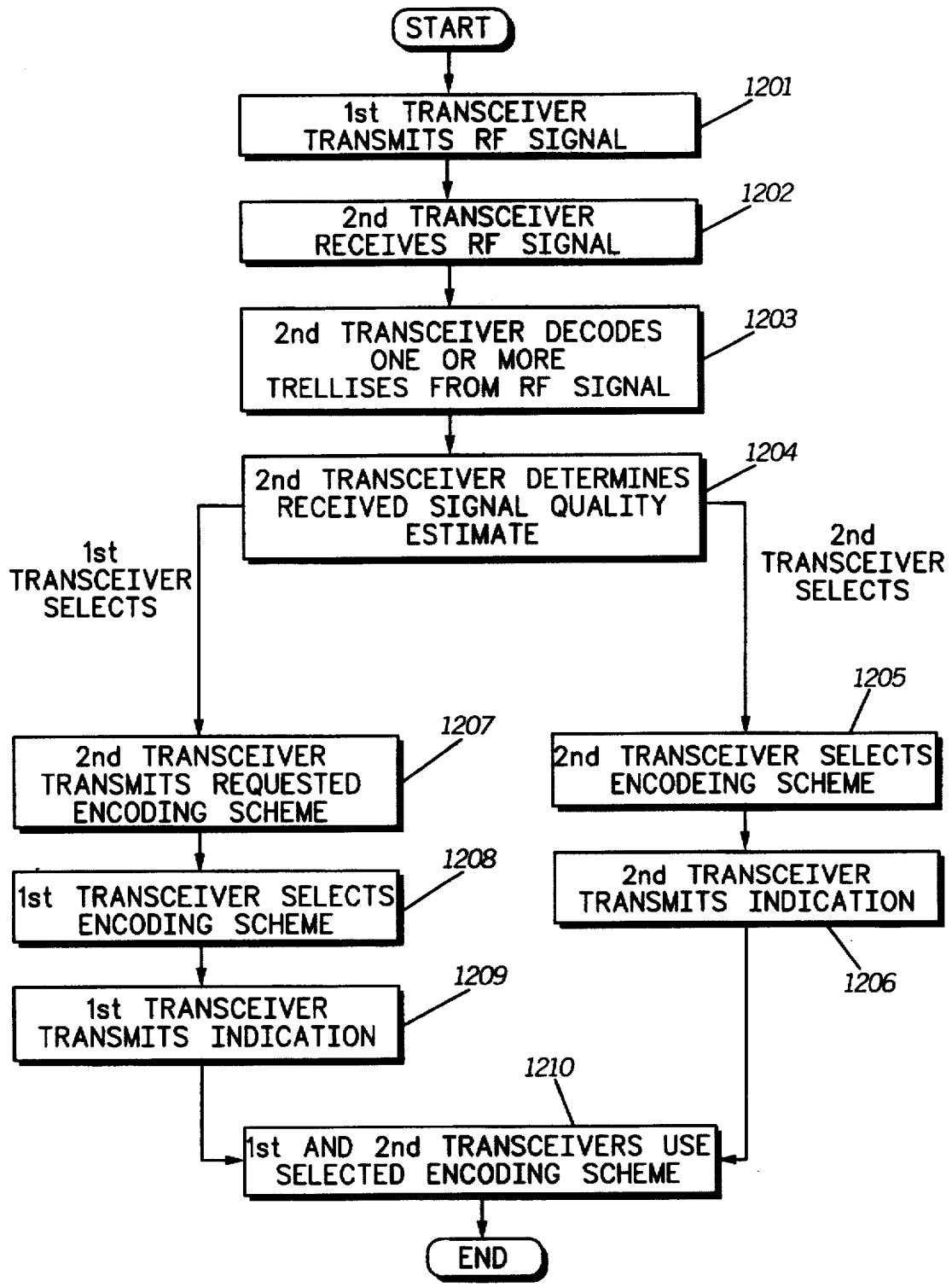

METHOD AND APPARATUS FOR DETERMINING A RECEIVED SIGNAL QUALITY ESTIMATE OF A TRELLIS CODE MODULATED SIGNAL

FIELD OF THE INVENTION

The present invention relates generally to trellis coded modulation and, in particular, to a method and apparatus for estimating received signal quality.

BACKGROUND OF THE INVENTION

Wireless digital communication systems which transceive data between a communication unit (e.g., an in-hand portable or in-car mobile radio) and one of a number of fixed base stations are well known in the art. In many such systems, the base stations may be located at different geographic locations in order to provide for geographic frequency reuse. Additionally, a base station or communication unit transmitting data may have the option of choosing from among several encoding schemes, each encoding scheme appropriate to different wireless channel conditions. In order for the most appropriate base station to be selected, and/or the most appropriate encoding scheme to be chosen, it is necessary to determine the quality with which digital information (voice and/or data) is received over the wireless channel.

Received signal strength indication (RSSI), bit error rate (BER), and block error rate (BlKER) are common techniques known in the art for determining the quality of received digital information. RSSI provides an estimate of the total received power for a signal received via a given wireless channel represented as the sum of the desired information signal (C), the co-channel interference (I), and the additive noise (N). As a result, RSSI cannot distinguish, for example, a high-quality signal having a high desired information component, C, from a low-quality signal having a high interference component, I. A receiver must be able to distinguish between high desired signal strength and high interfering or noise signal strengths in order to make efficient use of limited channel resources.

BER and BlKER measurements are capable of distinguishing the desired information component from the interference and noise components in a received signal since error rates will fall when the desired component increases, and will rise when the undesired interference and/or noise component rises. Thus, BER and BlKER can distinguish between high-quality and low-quality received information. However, excessive averaging times may be required in order to estimate signal quality under good conditions since the error rate will be very low. Furthermore, in systems using convolutional error correction coding, there may exist large ranges of signal quality which all yield no block or bit errors in practice, making high and very high quality received information indistinguishable. In order to make efficient use of limited channel resources, a receiver must be able to accurately estimate signal quality over a broader range than that offered by bit and block error rate methods.

Another method of estimating the quality of a data transfer is described in U.S. Pat. No. 5,440,582, entitled METHOD AND APPARATUS FOR DETERMINING SIGNAL USABILITY and assigned to Motorola, Inc. The method described therein overcomes the above problems with RSSI and error rates by providing a means to estimate the ratio $C/(I+N)$, which in turn is indicative of received signal quality. In particular, the method is most suitable for communication systems using lower-order symbol constellations, such as quaternary phase shift keying (QPSK) and low-order quadrature amplitude modulation (QAM), e.g., 16 QAM. However, the method described therein is less suitable for encoding schemes employing higher-order symbol constellations, e.g., 64 QAM and 256 QAM. Such higher order constellations are essential components of communication systems which provide the high data throughput rates needed for efficient data transfer with limited channel resources. Therefore, a need exists for an approach to determine received signal quality that is compatible with encoding schemes having high-order symbol constellations and that overcomes the prior art limitations of RSSI, BER, and BlKER.

BRIEF DESCRIPTION OF THE DRAWINGS

FIG. 12 is a flowchart of a method for selecting an encoding scheme that can be incorporated into a wireless digital communication system.

DESCRIPTION OF A PREFERRED EMBODIMENT

Figure 1:
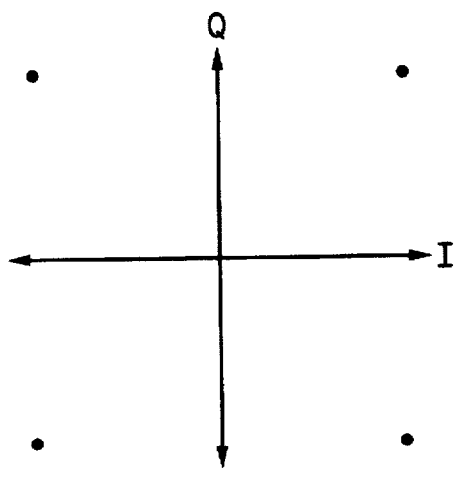
FIGS. 1–4 illustrate exemplary constellation patterns corresponding to QPSK, 16 QAM, 64 QAM, and 256 QAM encoding schemes, respectively.

Generally, the present invention provides an apparatus for, and method of, determining a received signal quality estimate based on one or more received trellises. A convolutional decoder is arranged to receive the one or more received trellises and to determine a path metric, proportional to the amount of channel-induced interference (I) and noise (N), for each of the one or more received trellises. Additionally, a signal strength estimator is provided to determine a signal strength estimate, proportional to the signal carrier strength (C), for each of the one or more received trellises. A signal quality estimator takes as input the path metrics and signal strength estimates for each of the received trellises and produces the received signal quality estimate, the received signal quality estimate being indicative of the ratio $C/(I+N)$. This approach is well-suited for use with encoding schemes having high-order symbol constellations. When incorporated into an RF transceiver, this method and apparatus for determining a received signal quality estimate can be used in the selection of an encoding scheme best adapted to ongoing RF channel conditions.

The present invention can be more adequately described with reference to FIGS. 1–12. FIGS. 1–4 illustrate exemplary constellation patterns corresponding to QPSK, 16 QAM, 64 QAM, and 256 QAM encoding schemes, respectively. Before describing these encoding schemes, a general discussion of symbols and trellis coded modulation (TCM) may prove helpful.

It is generally known in the art to combine k-bits of binary data into $2^k$ different real-valued symbols, which symbols are then transmitted via a wireless channel. As described below, the real-valued symbols can be combined to form complex-valued symbols. Thus, if the overall symbol transmission rate is kept constant (as assumed hereinafter), the overall data transmission rate (i.e., the number of bits transmitted) can be increased or decreased according to the number of bits, k, used to create each symbol. Further assuming a constant bandwidth for the wireless channel (also assumed hereinafter), the probability of channel-induced errors increases/decreases as the number of possible symbols increases/decreases. This can be seen in FIGS. 1–4. The average signal power for each constellation shown in FIGS. 1–4 is the same. However, to have the same average signal power, the higher-order constellations (i.e., constellations having more possible symbols) have a smaller minimum distance between symbol values on the I-Q plane, thus increasing the likelihood that noise will cause symbols to be incorrectly received.

TCM uses the error correction power of convolutional encoding to reduce the error rate in the decoded stream. Well-known convolutional codes are used to encode binary data by adding redundancy to the resulting encoded symbols. For example, a rate 1/2 code produces a symbol specified by two coded bits for every one bit input, a rate 2/3 code produces a symbol specified by three coded bits for every two bits input, etc. (As the code ratio decreases/ increases, the correcting power of the code is increased/ reduced.) In TCM, the coded bits are used to create the symbols for transmission. Thus, a j/(j+1) code is seen to double the number of possible symbols from $2^j$ to $2^{j+1}$. Although this results in decreasing inter-symbol distances, coding provides a gain in "distance" between allowable sequences of symbols.

Figure 2:
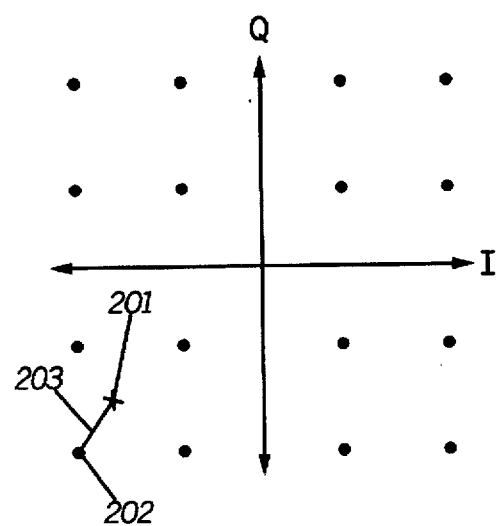
Figure 3:
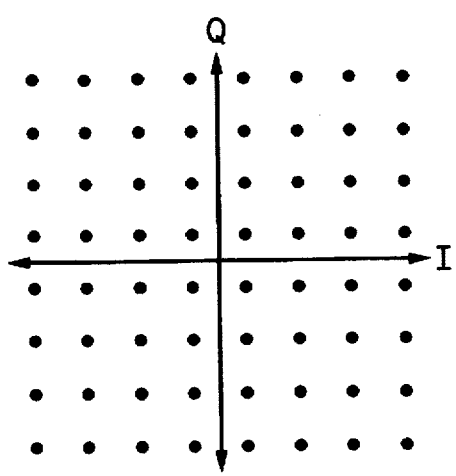
Figure 4:
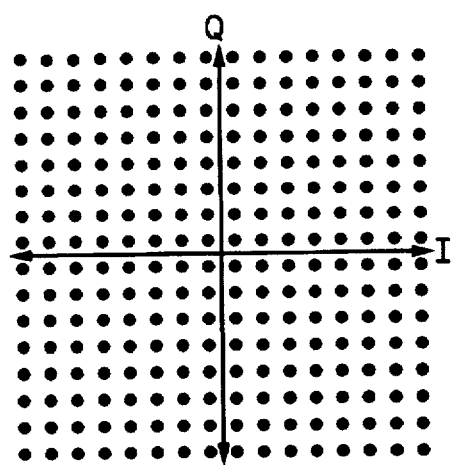

As illustrated, FIGS. 1–4 show constellations in complex planes, wherein each symbol comprises a real (I) and an imaginary (Q) component, expressed in equation form as $X=X_I+jX_Q$. FIG. 1 shows a constellation resulting from a rate 1/2 QPSK TCM encoder. Thus, for each bit shifted into the encoder, a complex two-bit symbol is output. That is, one of the coded bits is used as a real component, and the other coded bit is used as an imaginary component. FIGS. 2–4 represent slightly more sophisticated schemes.

In FIG. 2, a rate 1/2 convolutional code is used. In one possible embodiment each input bit is encoded into a four-level amplitude shift keying (4 ASK) real-valued symbol. (Multi-level ASK symbols are well known in the art.) Two of the resulting 4 ASK symbols are then combined in quadrature as the real ($X_I$) and complex ($X_Q$) components of the resulting 16 QAM symbol. Thus, each complex 16 QAM symbol corresponds to two input bits.

In FIG. 3, a rate 2/3 convolutional code is used, resulting in an 8 ASK real-valued symbol for every two bits input. In one possible embodiment, the rate 2/3 code comprises processing a first of the two input bits (referred to as the "encoded" bit) through the rate 1/2 coder to produce a 4 ASK symbol. The second of the two input bits is then used to shift a scaled version of the 4 ASK symbol to produce the 8 ASK symbol. This process can be shown as:

8 ASK symbol=0.5 (4 ASK symbol)+2(2$n_0$−1)

where $n_0$ is the second of the two input bits having a value of 0 or 1. For the purposes of discussion, $n_0$ is considered an "unencoded" bit in the sense that it does not contribute to the state of a convolutional encoder; it is in reality encoded in the sense that it influences a symbol value. Each 64 QAM symbol comprises two of the resulting 8 ASK symbols combined in quadrature as the real ($X_I$) and complex ($X_Q$) components. Thus, each complex 64 QAM symbol corresponds to four input bits.

In FIG. 4, a rate 3/4 convolutional code is used, resulting in a 16 ASK real-valued symbol for every three bits input. In one possible embodiment, the rate 3/4 code comprises processing a first of the three input bits (referred to as the "encoded" bit) through the rate 1/2 coder to produce a 4 ASK symbol. The second of the two input bits is then used to shift a scaled version of the 4 ASK symbol to produce an 8 ASK symbol, and the third of three input bits is used to shift a scaled version of the 8 ASK symbol to produce the 16 ASK symbol. This process can be shown as:

16 ASK symbol=0.5(0.5(4 ASK symbol)+2(2$n_0$−1))+2($n_1$−1)

where $n_0$ and $n_1$ are the second and third of the two input bits, respectively, each having a value of 0 or 1. As described relative to 64 QAM above, $n_0$ and $n_1$ are likewise considered "unencoded" bits. Two of the resulting 16 ASK symbols are then used as the real ($X_I$) and complex ($X_Q$) components of the resulting 256 QAM symbol. Thus, each complex 256 QAM symbol corresponds to six input bits. From the embodiments described above, it can be seen that the overall data transmission rate increases, while inter-symbol distances decrease, for higher-order symbol constellations.

Figure 5:
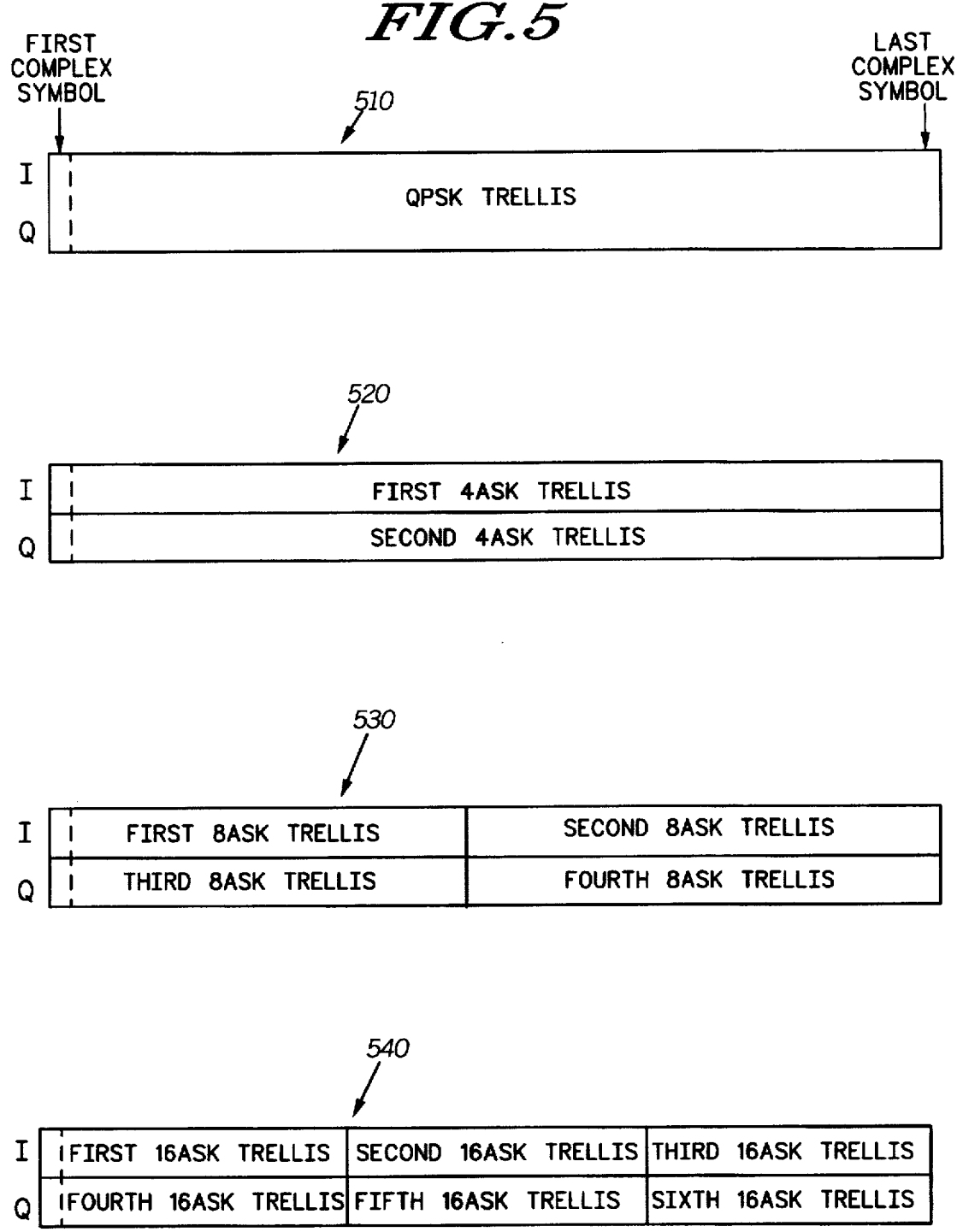
FIG. 5 illustrates the organization of trellises as complex-valued symbols for each of the exemplary constellations of FIGS. 1–4.

FIG. 5 illustrates the organization of trellises as complex-valued symbols for each of the exemplary constellations of FIGS. 1–4. In particular, slots 510–540 are shown for each constellation, each slot comprising one or more trellises. Slots are commonly used in the art to describe a basic transmission unit. It is also common in the art to refer to a number of blocks included within a slot. For the purposes of the present invention, it is assumed that a trellis is equivalent to a block and vice versa. It is understood that this equivalence may not always be necessary, depending on system requirements. The slots 510–540 comprise periods of time logically defined according to a time-division multiplexed (TDM) transmission scheme.

In the QPSK case (slot 510), each trellis (only one in the example shown) comprises one or more complex-valued symbols sequentially produced using a QPSK TCM scheme, as described above. In the QAM cases (slots 520–540), each trellis comprises a logical grouping of one or more real-valued symbols sequentially produced using a QAM TCM scheme, as described above. It is understood that in both the QPSK and QAM schemes, each trellis may alternatively comprise non-sequential (i.e., interleaved) symbols.

In the case of the QPSK scheme, the formation of each complex-valued symbol in the slot 510 is straightforward since the symbols resulting from the QPSK TCM encoder already comprise real and imaginary components. However, in the QAM schemes, the complex-valued symbols are formed from real-valued symbols included in the trellises. Thus, in the 16 QAM case, the real portion of the first complex symbol is the first real-valued symbol of the first 4 ASK trellis, and the imaginary portion of the first complex symbol is the first real-valued symbol of the second 4 ASK trellis, as denoted by the dotted line. Likewise in the 64 QAM and 256 QAM cases, the first complex symbol is a combination of real-valued symbols from the first and third trellises, and the first and fourth trellises, respectively. It is anticipated that other arrangements of trellises and complex symbols could also be used.

When any one of the slots 510–540 is transmitted and received, the complex symbols are determined by the receiving entity and used to reconstruct the one or more trellises included in the slot, resulting in received trellises. A received trellis may include incorrect symbols due to channel-induced interference and noise. This is illustrated in FIG. 6.

Figure 6:
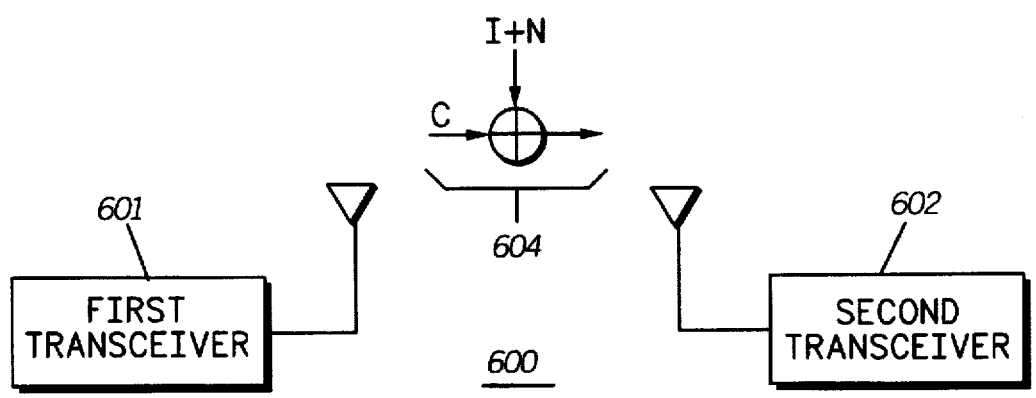
FIG. 6 is a block diagram of a wireless digital communication system.

FIG. 6 is a block diagram of a wireless digital communication system 600 in which the slots 510–540 can be transmitted and received. The wireless digital communication system 600 includes a first transceiver 601 and a second transceiver 602 which communicate via a wireless communication channel 604. The wireless communication resource 604 is represented as a carrier signal (C), used to convey information, and an additive interference (I) and noise (N) component well-known in the art. The carrier signal may comprise one or more RF carriers used to implement a TDM protocol.

Although only two transceivers are shown in FIG. 6 for simplicity, the wireless digital communication system 600 may include multiple transceivers. The first and second transceivers 601–602 may comprise portable/mobile radios, or fixed radios such as base stations and repeaters, or a combination thereof. The slots 510–540, and hence their constituent trellises, may form part of an RF signal transmitted by the first transceiver 601 to the second transceiver 602, or vice versa. As described below, the quality of trellises received via the RF signal can be determined in accordance with the present invention and used to select an encoding scheme (e.g., FIGS. 1–4) best suited to the current state of the wireless communication resource 604.

Figure 7:
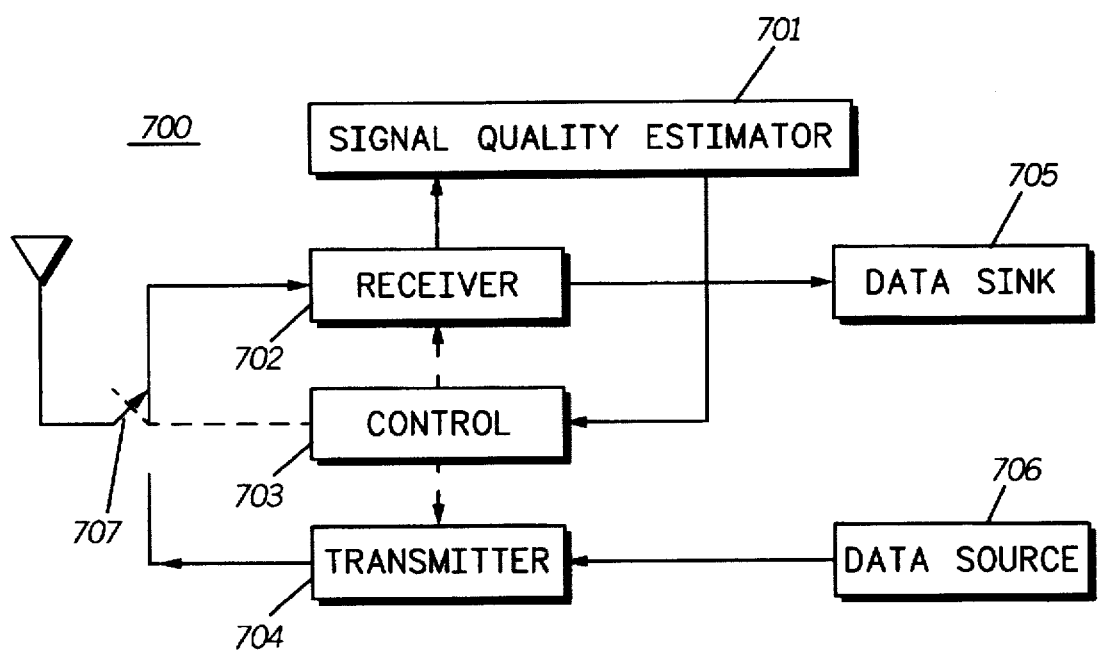
FIG. 7 is a block diagram of an RF transceiver that includes a signal quality estimator.

FIG. 7 is a block diagram of an RF transceiver 700 that includes a signal quality estimator 701. The RF transceiver 700 is representative of the first and second transceivers 601–602 shown in FIG. 6. An antenna switch 707, under the control of a controller 703, routes received RF signals to a receiver 702 or routes RF signals sourced by a transmitter 704. Alternatively, a duplexer can be used in place of the antenna switch 707. Typically, the controller 703 is implemented using a microprocessor of the sort well known in the art. As shown, the RF transceiver 700 could form part of a mobile or portable radio. In the case of a fixed radio, such as a base station or repeater, the transmitter 704 and receiver 702 would typically each have a separate antenna permitting simultaneous transmit and receive operations.

The controller 703 controls both the transmitter 704 and the receiver 702. Both the transmitter 704 and receiver 702 can be implemented using known hardware (such as digital-to-analog converters and modulators for the transmitter, and analog-to-digital converters and mixers for the receiver) and may include software algorithms, implemented on a microprocessor, used for the recovery of digital data. When necessary, data (bits) are sent by a data source 706 to the transmitter 704 for transmission. In turn, data (bits) recovered by the receiver 702 are sent to a data sink 705. The data source 706 and data sink 705 may comprise any suitable source and/or sink of digital data, such as a voice processing application or a user data application (e.g., a word processing application running on a personal computer).

The receiver 702 also sends information (path metrics and signal strength estimates, as described below) to the signal quality estimator 701 which in turn is in communication with the controller 703. The signal quality estimator 701 provides received signal quality estimates to the controller 703, which estimates can be used to control operation of the RF transceiver 700.

Figure 8:
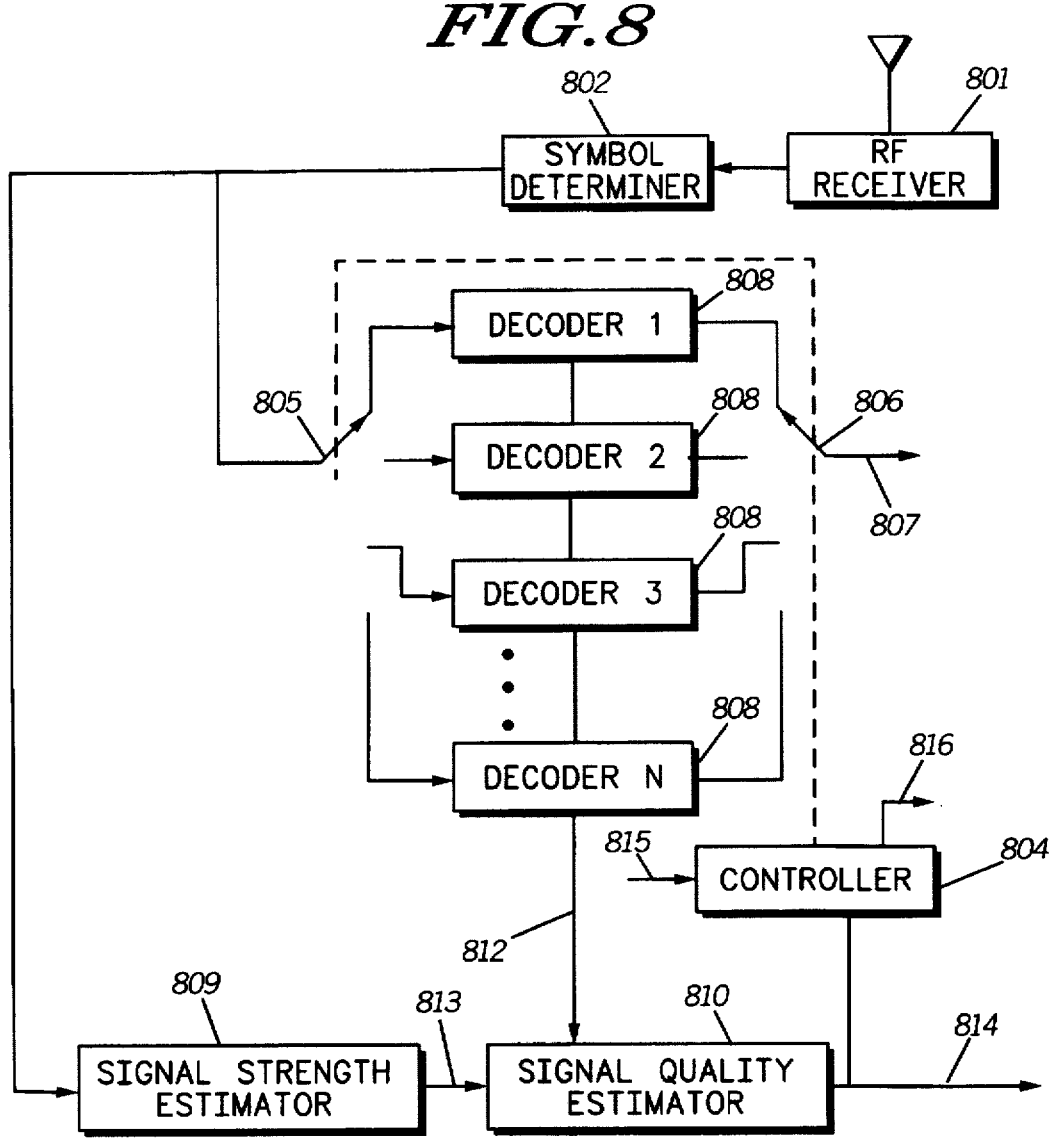
FIG. 8 is a block diagram of a receiving portion of an RF transceiver that includes a signal quality estimator.

FIG. 8 is a block diagram of a receiving portion of an RF transceiver that includes a signal quality estimator 810. In particular, the receiving portion comprises an RF receiver 801, a symbol determiner 802, routing switches 805–806, at least one decoder 808, and a signal strength estimator 809. In a first embodiment, the receiving portion described above is included in the receiver 702 of FIG. 7 and is implemented, at least partially, using software algorithms executed on a microprocessor or digital signal processor. Additionally, a controller 804 is included which corresponds to a portion of the controller 703 of FIG. 7.

The RF receiver 801, using techniques well-known in the art, receives an RF signal and converts it into a complex analog baseband signal that is fed to the symbol determiner 802. The symbol determiner 802 digitizes the complex analog signal and recovers from it synchronization and timing information and sequences of symbols that occur at discrete times. Each sequence of symbols corresponds to the symbols contained in one TDM time slot as shown in FIG. 5. Techniques for performing timing and symbol recovery are well known in the art, thus no further discussion will be presented.

Each decoder 808 corresponds to one of a plurality of encoding schemes available for use. Thus, following the examples given in FIGS. 1–4, there would be separate decoders 808 available for QPSK-encoded slots, 16 QAM-encoded slots, 64 QAM-encoded slots, and 256 QAM-encoded slots. In practice, provision of the proper decoder 808 is typically achieved by configuring one or more software algorithms to adapt their operation to the required decoding scheme; in this manner, a physically separate decoder is not required for each scheme.

On a regular basis during reception, a time slot of symbols is transferred from the symbol determiner 802 to one of the decoders 808 that has been selected by the controller 804. The decoder to be used is chosen by default or through prior communication between the transmitting transceiver and the receiving transceiver. The selected decoder interprets the complex symbols of the received slot as a set of trellises. As shown in FIG. 5, each slot may comprise one or more trellises. Furthermore, it is possible that a slot may comprise trellises resulting from different encoding schemes, e.g., one 4 ASK trellis and three 16 ASK trellises. Each trellis is convolutionally decoded to produce a sequence of recovered bits. The sequences of recovered bits from each of the decoded trellises in the slot are combined together to form the received data 807. In the process of decoding a received trellis, a convolutional decoder makes an estimate of the symbol values which it believes were originally sent by the transmitting transceiver when transmitting that trellis. This sequence of symbols is referred to as the recovered symbols.

In a preferred embodiment, the convolutional decoder portion of each decoder 808 is a Viterbi decoder, which those of ordinary skill in the art will recognize as producing the maximum likelihood (optimum) output. That is, as each received trellis is decoded through the Viterbi decoder, the resulting sequence of recovered symbols corresponds to those symbols which were most likely to have been transmitted. In the preferred embodiment, the Viterbi decoder starts decoding a received trellis in a first known state (such as the "zero state") and stops decoding the received trellis in a second known state. In practice, the first and second known states do not have to be identical. Bits that contain known values, often referred to as flush bits, are transmitted at the end of each trellis to allow the Viterbi decoder to enter this second known state.

Furthermore, the Viterbi decoder produces a path metric corresponding to a maximum likelihood path for each received trellis, wherein the path metric is proportional to the amount of error introduced into the symbols of the received trellis by the transmission channel. In effect, the path metric for each trellis is proportional to I+N, the sum of the interference and noise energies imposed on the received trellis by the transmission channel.

An example of this is shown in FIG. 2. A received symbol 201, after convolutional decoding, results in a recovered symbol 202. The distance 203 between the received symbol 201 and the recovered symbol 202 is proportional to the amount of error imposed on the received symbol. In decoding a received trellis, the path metric determined by the Viterbi decoder is proportional to the cumulative amount of error between the received symbols and each of the corresponding recovered symbols of the trellis.

In addition to being sent through a decoder 808, the symbols produced by the symbol determiner are sent to the signal strength estimator 809 which produces a signal strength estimate 813 for each received trellis. The signal strength estimate 813 for each trellis can reflect the total energy for each trellis or a portion thereof. In one embodiment of the present invention, the signal strength estimates 813 are determined according to the average energy found in pilot symbols transmitted along with the trellises. Use of pilot symbols for the derivation of a complex channel gain estimate (which those of ordinary skill in the art will recognize as being suitable for the derivation of a signal strength estimate) is discussed extensively in U.S. Pat. No. 5,140,615 entitled MAXIMAL RATIO DIVERSITY COMBINING TECHNIQUE and assigned to Motorola, Inc., the teachings of which patent are incorporated herein by reference. U.S. Pat. No. 5,140,615 teaches a method in which interpolations are performed between known pilot symbols to derive the signal strength estimate.

In another embodiment of the present invention, the signal strength estimates 813 are determined according to the average energy found in pilot and non-pilot (i.e., data) symbols. Although it is not possible to know what the non-pilot symbols will be before they are received, thereby making it impossible to know the average energy value for any particular trellis before it is received, the expected long term average energy over a group of trellises can be determined. By comparing an actual long term average energy value measured over a group of trellises with the expected long term average energy value, a signal strength estimate can be derived based on the difference between the actual and expected long term average energy values. It is further understood that any of a number of other methods for estimating received signal strength can be employed by the present invention. Regardless of the method used, the signal strength estimate 813 for each received trellis is proportional to C+I+N, the sum of the carrier, interference and noise energies corresponding to the received trellis.

Once determined, the path metrics 812 and signal strength estimates 813 for the received trellises are sent to the signal quality estimator 810 which determines a received signal quality estimate 814 based on the path metrics 812 and signal strength estimates 813, as discussed in detail below. The received signal quality estimate 814 is an estimate, in one embodiment, of a carrier-to-interference-plus-noise ratio (C/(I+N)) for the transmission channel. In other embodiments, the received signal quality estimate 814 is an estimate of a bit error rate or a block error rate for the transmission channel.

The received signal quality estimate 814 is examined by the controller 804 which determines which of the encoding schemes is most appropriate to use for future transmissions under the estimated conditions. As discussed below, a requested encoding scheme message 816 that includes the received signal quality estimate 814 can be conveyed to the transmitting transceiver that is the source of the currently received signals. The transmitting transceiver, in response to the requested encoding scheme message 816, can transmit an indication 815, ultimately sent to the controller 804, that specifies a particular encoding scheme to be used in future transmissions. In this manner, the controller 804 facilitates a determination of which encoding scheme is to be used for signals received in the future. The indication 815 of the selected encoding scheme is used to control the switches 805–806, as indicated by the dashed line. In general, when the received signal quality estimate 814 reflects a high quality channel (i.e., high C/(I+N) and/or low error rates), an encoding scheme having a higher overall data transmission rate with decreased error protection, e.g., 64 QAM or 256 QAM, is selected. Conversely, when the received signal quality estimate 814 reflects a low quality channel (i.e., low C/(I+N) and/or high error rates), an encoding scheme having a lower overall data transmission rate with increased error protection, e.g., QPSK or 16 QAM, is selected.

Figure 10:
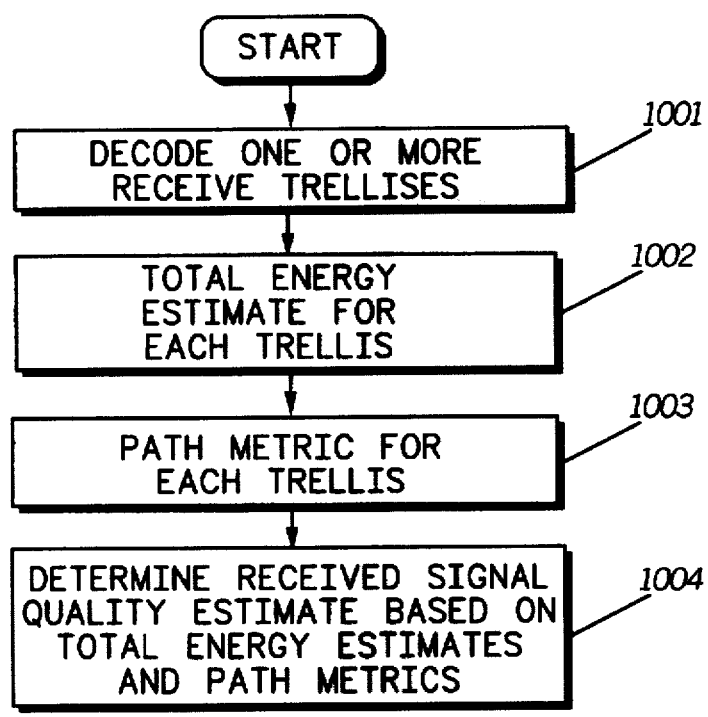
FIG. 10 is a flowchart of a method for determining a received signal quality estimate.

FIG. 10 is a flowchart of the method for determining a received signal quality estimate, as described above. At step 1001, one or more received trellises are decoded. At steps 1002 and 1003, a signal strength estimate and a path metric are respectively determined for each of the one or more received trellises. At step 1004, the received signal quality estimate is determined based on the signal strength estimate and the path metric for each of the received trellises.

Figure 11:
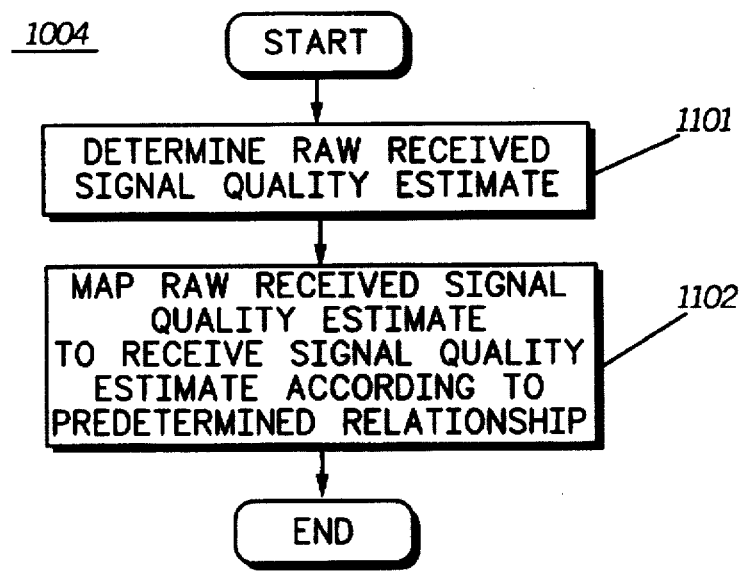
FIG. 11 is a flowchart illustrating, in greater detail, a first embodiment of a step shown in FIG. 10.

FIG. 11 is a flowchart illustrating, in greater detail, a first embodiment of step 1004 shown in FIG. 10. At step 1101, a raw received signal quality estimate is determined based on the path metrics and the signal strength estimates. In a first embodiment, the raw received signal quality estimate is determined according to equation (1):

$$R = 10 \log_{10} \left( \frac{1}{N} \sum_{i=1}^{N} \frac{C_i}{M_i} \right) \qquad (1)$$

where R is the raw received signal quality estimate expressed in decibels; N indicates how many of the one or more received trellises are included in the raw received signal quality estimate; $C_i$ is the signal strength estimate for the i'th received trellis; and $M_i$ is the path metric for the i'th received trellis. Each path metric, in a preferred embodiment, is the sum of the branch metrics (proportional to the squared Euclidean distance between a received symbol and all candidate symbols) determined for each recovered symbol in a trellis.

In a second, third, and fourth embodiment, the raw received signal quality estimate is determined according to equations (2)–(4), respectively:

$$R = 10 \log_{10} \left( \frac{\frac{1}{N} \sum_{i=1}^{N} C_i}{\frac{1}{N} \sum_{i=1}^{N} M_i} \right) \qquad (2)$$

$$R = \frac{1}{N} \sum_{i=1}^{N} 10 \log_{10} \left( \frac{C_i}{M_i} \right) \qquad (3)$$

$$R = \operatorname*{median}_{i=1}^{N} \left[ 10 \log_{10} \left( \frac{C_i}{M_i} \right) \right] \qquad (4)$$

where R, N, $C_i$, and $M_i$ are defined as in equation (1). The function "median[ ]" describes the well-known process of selecting a median value.

Regardless of the method used in its calculation, the raw received signal quality estimate is mapped, according to a predetermined relationship, to the received signal quality estimate at step 1102. This is illustrated in FIG. 9.

Figure 9:
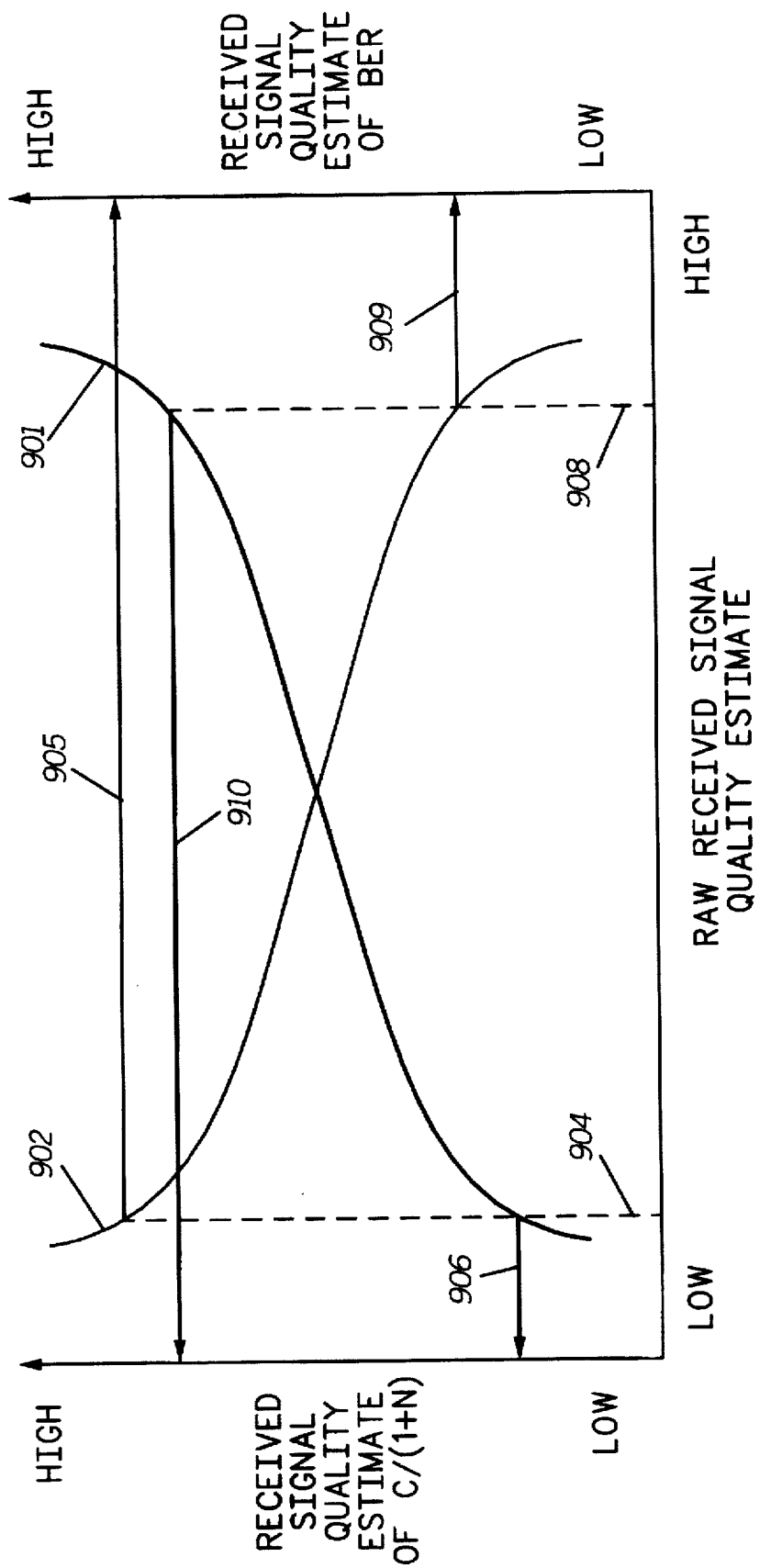
FIG. 9 is a graph illustrating predetermined relationships between a raw signal quality estimate and a received signal quality estimate.

FIG. 9 is a graph illustrating predetermined relationships 901-902 between a raw signal quality estimate and a received signal quality estimate. In practice, the predetermined relationships 901-902 are determined through empirical determination and comparison of raw received signal quality estimates under known signal quality conditions. As shown in FIG. 9, a first predetermined relationship 901 is used to map the raw received signal quality estimate (shown along the horizontal axis) into the received signal quality estimate (shown along the vertical axis) expressed as a carrier-to-interference-plus-noise ratio. Conversely, a second predetermined relationship 902 is used to map the raw received signal quality estimate into the received signal quality estimate expressed as, for example, a bit error rate. Although not shown, a third predetermined relationship (having a generally negative slope similar to the second predetermined relationship 902) could be used to map the raw received signal quality estimate into the received signal quality estimate expressed as a block error rate. In general, separate predetermined relationships are required for each encoding scheme used.

For example, if a relatively low raw received signal quality estimate 904 is determined (per step 1101), the first predetermined relationship 901 results in a correspondingly low carrier-to-interference-plus-noise ratio 906, whereas the second predetermined relationship 902 results in a correspondingly high bit error rate 905. Conversely, if a relatively high raw received signal quality estimate 908 is determined, the first predetermined relationship 901 results in a correspondingly high carrier-to-interference-plus-noise ratio 910, whereas the second predetermined relationship 902 results in a correspondingly low bit error rate 909.

The plateaus exhibited by the predetermined relationships 901-902 at either extreme of the raw signal quality estimate are a result of hardware and algorithmic limitations. That is, at the upper end (i.e., increasing raw received signal quality estimate) the effects of imperfections inherent to, for example, the RF receiver 801, place an upper limit on the received signal quality estimate that can be accurately measured. At the lower end (i.e., decreasing raw received signal quality estimate) the occurrence of too many errors in the convolutional decoding process places a lower limit on the received signal quality estimate that can be accurately measured. Furthermore, it is recognized that equations (1)-(4) used to calculate the raw received signal quality estimates in reality reflect a ratio of (C+I+N)/(I+N). At relatively "high" carrier-to-interference-plus-noise ratios, this approximates the ratio C/(I+N) with sufficient accuracy such that the predetermined relationships can be used to determine a "true" estimate. However, at lower carrier-to-interference-plus-noise ratios, the interference and noise components dominate, and the approximation breaks down. The exact range of true carrier-to-interference-plus-noise ratio for which the approximation is valid depends in part on the accuracy required, hardware limitations, averaging lengths, etc. For the purposes of wireless digital communication systems, such as land-mobile and cellular radio systems, however, the approximation is valid in that range of carrier-to-interference-plus-noise ratios for which communications are normally possible.

FIG. 12 is a flowchart of a method that can be incorporated into a wireless digital communication system. At step 1201, a first RF transceiver transmits an RF signal, e.g., the first transceiver 601 transmitting via the wireless communication resource 604. At Step 1202, the RF signal is received by a second RF transceiver, e.g., the second transceiver 602. At step 1203, one or more received trellises are extracted from the RF signal and decoded. As described above with respect to FIGS. 10 and 11, the received trellises are processed to determine the received signal quality estimate at step 1204.

In the event that the second RF transceiver (i.e., the receiving transceiver) further processes the received signal quality estimate, the method continues at step 1205 where the second RF transceiver selects an encoding scheme, as described above. Having determined a selected encoding scheme, the second RF transceiver transmits an indication of the selected encoding scheme to the first RF transceiver at step 1206.

In the event that the first RF transceiver (i.e., the transmitting transceiver) further processes the received signal quality estimate, the method continues at step 1207 where the second RF transceiver transmits a requested encoding scheme message, that includes the received signal quality estimate, to the first RF transceiver. At step 1208, the first RF transceiver selects an encoding scheme, as described above, based on the received signal quality estimate sent in step 1207. Having determined a selected encoding scheme, the first RF transceiver transmits an indication of the selected encoding scheme to the second RF transceiver at step 1209.

Regardless of whether the first or second RF transceiver determines the selected encoding scheme, at step 1210, both transceivers are free to use the selected encoding scheme for future communications. Of course, the process described in FIG. 12 can be repeated using future communications as the basis for reselecting an encoding scheme best suited for current channel conditions.

The present invention provides a method and apparatus for determining a received signal quality estimate. In particular, the present invention is well suited for use in digital communication systems which use high-order symbol constellations. Information regarding channel interference and noise inherently derived by convolutional decoding is used by the present invention to approximate a C/(I+N) ratio, a bit error rate, or a block error rate. This is an improvement over known RSSI methods which cannot discriminate between high and low quality signals. Furthermore, the present invention, by relying on an interference-plus-noise measure that is an inherent product of convolutional decoding, avoids signaling overhead associated with bit and block error rate techniques. Also, the present invention does not require excessive averaging times (as with the block error methods), particularly during low error conditions.

Furthermore, the present invention provides a method in which transceivers can select an encoding scheme best suited for ongoing transmission channel conditions.

We claim:

1. A method for determining a received signal quality estimate based on at least one received trellis, wherein each of the at least one received trellis comprises a plurality of received symbols, the method comprising steps of:

decoding the at least one received trellis using at least one convolutional decoder to produce a path metric for each of the at least one received trellis, wherein each path metric is representative of the cumulative error introduced into the corresponding at least one received trellis;

determining a signal strength estimate for each of the at least one received trellis; and determining the received signal quality estimate based on the path metric and the signal strength estimate for each of the at least one received trellis.

2. The method of claim 1, further comprising the step of decoding the one or more received trellises wherein the at least one convolutional decoder is a Viterbi decoder.

3. The method of claim 2, further comprising the step of decoding the one or more received trellises wherein the path metric for each of the one or more received trellises corresponds to a maximum likelihood path for each of the one or more received trellises.

4. The method of claim 3, further comprising the step of decoding the one or more received trellises wherein the Viterbi decoder starts at a first known state and stops at a second known state when decoding each of the one or more received trellises.

5. The method of claim 1, further comprising the step of determining the signal strength estimate for each of the one or more received trellises based on pilot symbols transmitted along with the one or more received trellises.

6. The method of claim 1, further comprising the step of determining the signal strength estimate for each of the one or more received trellises based on pilot symbols transmitted along with the one or more received trellises and non-pilot symbols included in the one or more received trellises.

7. The method of claim 1, further comprising the step of determining the received signal quality estimate wherein a raw received signal quality estimate is determined according to the equation:

$$R = 10 \log_{10} \left( \frac{1}{N} \sum_{i=1}^{N} \frac{C_i}{M_i} \right)$$

where:

R is the raw received signal quality estimate;

N indicates how many of the one or more received trellises are included in the raw received signal quality estimate;

$C_i$ is the signal strength estimate for each of the one or more received trellises; and $M_i$ is the path metric for each of the one or more received trellises.

8. The method of claim 7, further comprising the step of determining the received signal quality estimate by mapping the raw received signal quality estimate into the received signal quality estimate, expressed as a carrier-to-interference-plus-noise ratio, according to a first predetermined relationship.

9. The method of claim 7, further comprising the step of determining the received signal quality estimate by mapping the raw received signal quality estimate into the received signal quality estimate, expressed as a bit error rate, according to a second predetermined relationship.

10. The method of claim 7, further comprising the step of determining the received signal quality estimate by mapping the raw received signal quality estimate into the received signal quality estimate, expressed as a block error rate, according to a third predetermined relationship.

11. The method of claim 1, further comprising the step of determining the received signal quality estimate wherein a raw received signal quality estimate is determined according to the equation:

$$R = 10 \log_{10} \left( \frac{\frac{1}{N} \sum_{i=1}^{N} C_i}{\frac{1}{N} \sum_{i=1}^{N} M_i} \right)$$

where:

R is the raw received signal quality estimate;

N indicates how many of the one or more received trellises are included in the raw received signal quality estimate;

$C_i$ is the signal strength estimate for each of the one or more received trellises; and $M_i$ is the path metric for each of the one or more received trellises.

12. The method of claim 1, further comprising the step of determining the received signal quality estimate wherein a raw received signal quality estimate is determined according to the equation:

$$R = \frac{1}{N} \sum_{i=1}^{N} 10 \log_{10} \left( \frac{C_i}{M_i} \right)$$

where:

R is the raw received signal quality estimate;

N indicates how many of the one or more received trellises are included in the raw received signal quality estimate;

$C_i$ is the signal strength estimate for each of the one or more received trellises; and $M_i$ is the path metric for each of the one or more received trellises.

13. The method of claim 1, further comprising the step of determining the received signal quality estimate wherein a raw received signal quality estimate is determined according to the equation:

$$R = \underset{i=1}{\overset{N}{\text{median}}} \left[ 10 \log_{10} \left( \frac{C_i}{M_i} \right) \right]$$

where:

R is the raw received signal quality estimate;

N indicates how many of the one or more received trellises are included in the raw received signal quality estimate;

$C_i$ is the signal strength estimate for each of the one or more received trellises; and $M_i$ is the path metric for each of the one or more received trellises.

14. The method of claim 1, further comprising a step of: selecting an encoding scheme of a plurality of encoding schemes based on the received signal quality estimate.

15. A method for a second RF transceiver to determine a received signal quality estimate for an RF signal transmitted by a first RF transceiver, the method comprising steps of:

receiving the RF signal;

extracting, from the RF signal, received symbols to produce at least one received trellis, wherein each of the at least one received trellis comprises a plurality of the received symbols;

decoding the at least one received trellis using at least one Viterbi decoder to produce a path metric for each of the at least one received trellis, wherein each path metric is representative of the cumulative error introduced into the corresponding at least one received trellis;

determining a signal strength estimate for each of the at least one received trellis; and determining the received signal quality estimate for the RF signal based on the path metric and the signal strength estimate for each of the at least one received trellis.

16. The method of claim 15, further comprising the step of decoding the one or more received trellises wherein the path metric for each of the one or more received trellises corresponds to a maximum likelihood path for each of the one or more received trellises.

17. The method of claim 15, further comprising the step of determining the signal strength estimate for each of the one or more received trellises based on pilot symbols transmitted along with the one or more received trellises.

18. The method of claim 15, further comprising the step of determining the signal strength estimate for each of the one or more received trellises based on pilot symbols transmitted along with the one or more received trellises and non-pilot symbols included in the one or more received trellises.

19. The method of claim 15, further comprising the step of determining the received signal quality estimate wherein a raw received signal quality estimate is determined according to the equation:

$$R = 10 \log_{10}\left(\frac{1}{N} \sum_{i=1}^{N} \frac{C_i}{M_i}\right)$$

where:

R is the raw received signal quality estimate;

N indicates how many of the one or more received trellises are included in the raw received signal quality estimate;

$C_i$ is the signal strength estimate for each of the one or more received trellises; and $M_i$ is the path metric for each of the one or more received trellises.

20. The method of claim 19, further comprising the step of determining the received signal quality estimate by mapping the raw received signal quality estimate into the received signal quality estimate, expressed as a carrier-to-interference-plus-noise ratio, according to a first predetermined relationship.

21. The method of claim 19, further comprising the step of determining the received signal quality estimate by mapping the raw received signal quality estimate into the received signal quality estimate, expressed as a bit error rate, according to a second predetermined relationship.

22. The method of claim 19, further comprising the step of determining the received signal quality estimate by mapping the raw received signal quality estimate into the received signal quality estimate, expressed as a block error rate, according to a third predetermined relationship.

23. The method of claim 15, further comprising steps of: transmitting a requested coding scheme message that includes the received signal quality estimate to the first RF transceiver;

selecting, by the first RF transceiver, an encoding scheme of a plurality of encoding schemes based on the received signal quality estimate to produce a selected encoding scheme; and transmitting, by the first RF transceiver, an indication of the selected encoding scheme to the second RF transceiver.

24. The method of claim 15, further comprising steps of: selecting an encoding scheme of a plurality of encoding schemes based on the received signal quality estimate to produce a selected encoding scheme; and transmitting an indication of the selected encoding scheme to the first RF transceiver.

25. An apparatus for an RF transceiver comprising:

an RF receiver for receiving an RF signal to produce a received signal;

a symbol determiner, coupled to the RF receiver, for extracting at least one received trellis from the received signal, wherein each of the at least one received trellis comprises a plurality of received symbols;

at least one convolutional decoder, coupled to the symbol determiner, for decoding the at least one received trellis to produce a path metric for each of the at least one received trellis, wherein each path metric is representative of the cumulative error introduced into the corresponding at least one received trellis;

a signal strength estimator, coupled to the symbol determiner, for determining a signal strength estimate for each of the at least one received trellis; and a signal quality estimator, arranged to receive the path metric and signal strength estimate for each of the at least one received trellis, for determining a received signal quality estimate based on the path metric and the signal strength estimate for each of the at least one received trellis.

26. The RF transceiver of claim 25, further comprising:

a controller, coupled to the signal quality estimator, that produces a requested encoding scheme message in response to the received signal quality estimate, wherein the requested encoding scheme message includes the received signal quality estimate.

27. The RF transceiver of claim 26, further comprising:

an RF transmitter, coupled to the controller, for transmitting the requested encoding scheme message to another RF transceiver that transmitted the RF signal.

28. A wireless digital communication system comprising:

a first RF transceiver that transmits an RF signal;

a second RF transceiver comprising:

an RF receiver for receiving the RF signal to produce a received signal;

a symbol determiner, coupled to the RF receiver, for extracting one or more received trellises from the received signal;

at least one convolutional decoder, coupled to the symbol determiner, for decoding the one or more received trellises to produce a path metric for each of the one or more received trellises;

a signal strength estimator, coupled to the symbol determiner, for determining a signal strength estimate for each of the one or more received trellises;

a signal quality estimator, arranged to receive the path metric and signal strength estimate for each of the one or more received trellises, for determining a received signal quality estimate based on the path metric and the signal strength estimate for each of the one or more received trellises;

a controller, coupled to the signal quality estimator, that produces a requested encoding scheme message in response to the received signal quality estimate, wherein the requested encoding scheme message includes the received signal quality estimate; and an RF transmitter, coupled to the selector, for transmitting the requested encoding scheme message to the first RF transceiver.

\* \* \* \* \*